No. 783,486. Patented February 28, 1905.

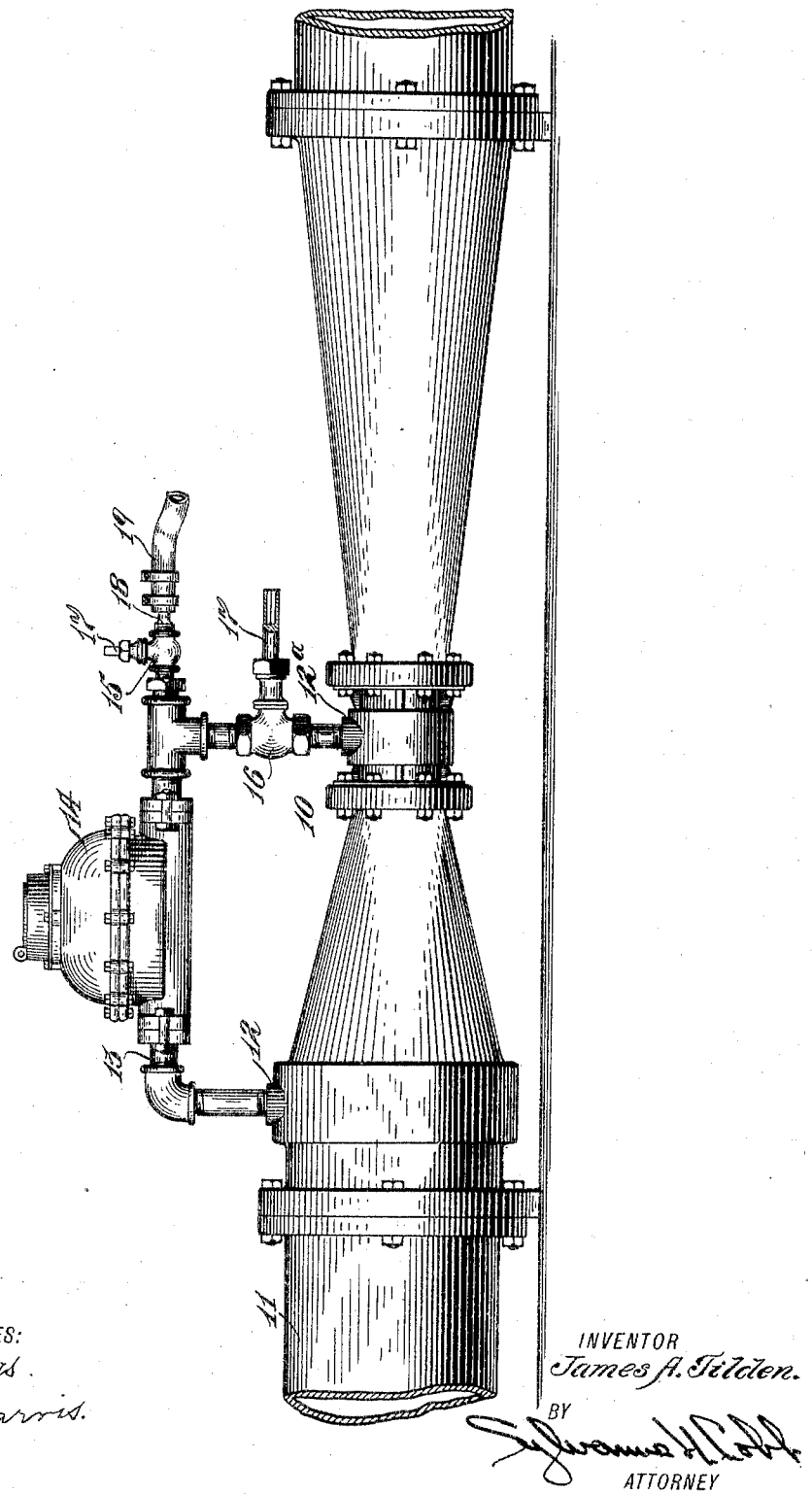

UNITED STATES PATENT OFFICE.

JAMES A. TILDEN, OF HYDEPARK, MASSACHUSETTS, ASSIGNOR TO HERSEY MANUFACTURING COMPANY, OF SOUTH BOSTON, MASSACHUSETTS, A CORPORATION OF MAINE.

METER.

SPECIFICATION forming part of Letters Patent No. 783,486, dated February 28, 1905.

Application filed October 7, 1904. Serial No. 227,599.

*To all whom it may concern:*

Be it known that I, JAMES A. TILDEN, a citizen of the United States, residing at Hydepark, in the county of Norfolk and State of Massachusetts, have invented certain new and useful Improvements in Meters, of which the following is a specification.

My invention relates to fluid-meters, and particularly to those of the proportional type. In such apparatus some fractional part of the entire flow is measured by a suitable registering mechanism, any error in which will be multiplied in determining the total amount. For this reason it is very essential that means be provided for conveniently testing the accuracy of the registering mechanism, and to furnish this is the principal object of this invention.

The drawing illustrates in side elevation one embodiment of my invention.

The proportional meter shown is a well-known form, in which a Venturi tube 10 constitutes a resistance device and serves as a part of a main conduit 11 and has connected to its portion 12 of maximum diameter a by-pass conduit 13, which also opens into the tube at its throat 12$^a$. In the by-pass is inserted a registering mechanism, which may be any suitable meter 14, recording the passage of fluid through it—as, for example, one of the piston or disk type. The by-pass is provided with an opening having associated with it controlling means, in the present instance consisting of an outlet-valve 15. In the by-pass on the opposite or eduction side of the opening from the registering mechanism is a valve 16 for controlling the flow into the main conduit, the registering mechanism being on the induction side of said opening. The valves may both have socket-stems 17 to receive keys, this preventing their being tampered with by unauthorized persons. Made into the outlet of the valve 15 is shown a nipple 18, to which is attached a hose 19, conducting the discharge to any desired point.

The fluid-flow divides itself between the main conduit and by-pass, the proportion being substantially constant, and when the registering mechanism is correct the total amount passing is given by multiplying its reading by the proper constant. If it is desired to examine the registering mechanism to determine its accuracy, it is only necessary to close the valve 16, thus stopping the flow from the by-pass into the main conduit and to open the valve 15. The hose being arranged to direct the flow into a receptacle which may be weighed, a comparison of the quantity discharged with the reading of the measuring mechanism will permit any error of the latter to be ascertained and corrected, either by adjusting the mechanism or altering the constant. It should be noted that this testing operation in no way interferes with the service, the delivery continuing through the main conduit and the operation of the registering mechanism being only momentarily interrupted.

Having thus described my invention, I claim—

1. The combination with a main conduit, of a resistance device in said conduit, a by-pass conduit associated therewith and being provided with an opening, registering mechanism in the by-pass, means for controlling the flow from the by-pass opening, and a valve in the by-pass situated upon the eduction side of the opening.

2. A proportional meter comprising a Venturi tube, a by-pass conduit opening from the maximum diameter and from the throat of said tube, a registering-meter in the by-pass, an outlet-valve in the by-pass upon the eduction side of the registering-meter, and means for controlling the flow through the by-pass into the tube.

3. A proportional meter comprising a main conduit, a resistance device in said main conduit, a by-pass conduit opening from the main conduit at each side of the resistance device, a registering-meter in the by-pass, an outlet-valve in the by-pass upon the eduction side of the registering-meter, and means for controlling the flow through the by-pass into the main conduit.

4. A proportional meter comprising a main conduit, a resistance device in said main conduit, a by-pass conduit opening from the main conduit at each side of the resistance device, a registering-meter in the by-pass, an outlet-valve in the by-pass upon the eduction side of the registering-meter, and a valve in the by-pass situated upon the eduction side of the outlet-valve.

Signed at Boston, in the county of Suffolk and State of Massachusetts, this 4th day of October, 1904.

JAMES A. TILDEN.

Witnesses:
FRANCIS C. HERSEY, Jr.,
HENRY D WINTON.